Feb. 23, 1954

R. D. KEENEY 2,669,750

INJECTION MOLDING DEVICE

Filed Nov. 21, 1950

INVENTOR.
BY Rollin D. Keeney
Robert M. Dickey
ATTORNEY

Patented Feb. 23, 1954

2,669,750

UNITED STATES PATENT OFFICE 2,669,750

INJECTION MOLDING DEVICE

Rollin D. Keeney, Springfield, Mass., assignor to Monsanto Chemical Company, St. Louis, Mo.

Application November 21, 1950, Serial No. 196,784

7 Claims. (Cl. 18—30)

This invention relates to injection molding machines and more particularly to a mixing plug therefor.

One of the major problems in the efficient operation of injection molding machines is to obtain maximum homogenization of the materials being forced through the machine to the die without unduly increasing the temperature of the material or producing a high back pressure. Excessively high temperatures cause deterioration of many molding materials and excessive back pressure slows down the operation of the machine.

One object of this invention is to provide a mixing plug for injection molding machines.

Another object is to provide a mixing plug for injection molding machines which will be operative at standard molding temperatures and pressures.

These and other objects are attained by a mixing plug containing a plurality of grooves as will be more fully and specifically set forth with reference to the drawings which are partly in section and partly in elevation, Fig. 1 being directed to the generic invention and Fig. 2 to a specific embodiment thereof.

Figure 1:
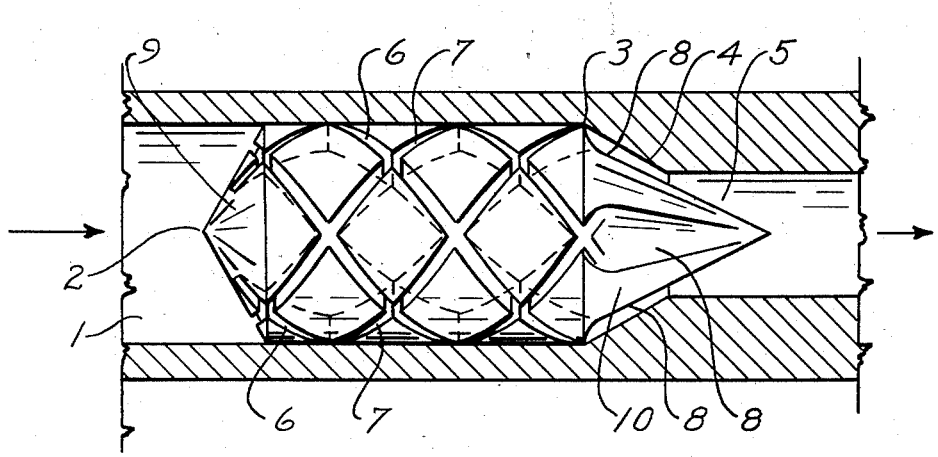

In Fig. 1, I is a cylindrical chamber of conventional injection molding machine, said chamber terminating at shoulder 3. From the shoulder a truncated conical section 4 leads to injection nozzle 5. Plug 2 is a solid cylinder having substantially the same cross-sectional dimension as chamber I so that the surface of the plug is substantially contiguous with the wall of the chamber. The ends 9 and 10 of the plug are tapered to provide for streamlined flow end 10 having a longer taper than end 9. The forward cylindrical portion of the plug abuts the shoulder 3 of the cylinder I. The plug 2, carries on its surface, a plurality of right-hand helical grooves 6 and of left-hand helical grooves 7 starting at the rear end 9 of the plug and terminating in straight channels 8 at front end 10, said channels 8 extending straight along the surface of tapered end 10.

In the operation of an injection molding machine carrying the present invention, a moldable material, e. g., a mixture of dye and clear polystyrene, is loaded through a hopper, not shown, and is heated to a molten or plastic state by heated jackets or electrical means, also not shown. A hydraulic plunger or piston, not shown, then forces the molten material forward into cylinder I in the direction of the arrows, and thence through the grooves 6 or 7, through channels 8 into injection nozzle 5 and onward to a mold or die, not shown.

Before the molten material enters grooves 6 and 7, it need not be subjected to any mechanical mixing action. When it reaches the grooves it is divided into a plurality of thin ribbon-like streams which converge upon each other at each confluence of the grooves with sufficient force and angularity so that a thorough malaxation takes place at each such confluence. By the time that the material reaches shoulder 3 of cylinder I, it is completely homogenized and flows rapidly through channels 8 and nozzle 5 into the die.

In order to obtain efficient and complete homogenization of the moldable material, there must be an equal number of right-hand and left-hand grooves and the dimensions of the grooves must be substantially identical. Thus the pitch of the helices, the width, depth and length of all of the grooves must be approximately equal. For efficient mixing action, the ratio of depth of the groove to the width thereof must be at least 1 to 1 and may be as large as 5 to 1. The shape of the grooves is not critical but for practical purposes, grooves which have parallel sides or which are slightly larger at the top than at the bottom are preferred. The bottom of the grooves may be flat or they may be rounded to facilitate cleaning thereof between batches of moldable material. Furthermore the grooves must be continuous so that there is a smooth even flow of the material along the entire length of the plug broken only by the mixing action at the confluence of the grooves.

The number of grooves cut into the surface of the plug must be at least eight. As the number of grooves is increased the number of streams of moldable material and the number of mixing points increases but the strength of the islands formed by the grooves decreases. Moreover the size of the injection molding machine and consequently the size of the cylinder and plug effects the number of grooves which may be used efficiently. For most of the machines currently in use, it is sufficient to have from 16 to 24 grooves or from 8 to 12 grooves in each direction.

The mixing plugs have been described as inserts in the cylinder of an injection molding machine. They may also be designed to be placed in the injection nozzle, in which case they are merely smaller copies of the plugs used in the cylinder. In some instances, the injection nozzles are conical in shape so that the plug must be conical instead of cylindrical. In any event, the plug should have substantially the same dimensions as the nozzle or cylinder into which it is inserted so that the walls of the plug are contiguous with the walls of the cylinder or nozzle and the continuous grooves must conform to the description given above. The length of the plug is critical to the extent that if it is too long, it will cause an increase in back pressure and temperature and if it is too short insufficient mixing is obtained. In general the length of the plug may vary from 1 to 3 times its diameter. The mixing plugs are immovably positioned in the cylinder by reason of frictional contact between the plug and cylinder, i. e., there is no rotational or linear movement of the plug during normal operation of the machine. However, the frictional forces are not so great but that it is a relatively simple procedure to remove the plug from the cylinder or nozzle for cleaning purposes.

Figure 2:
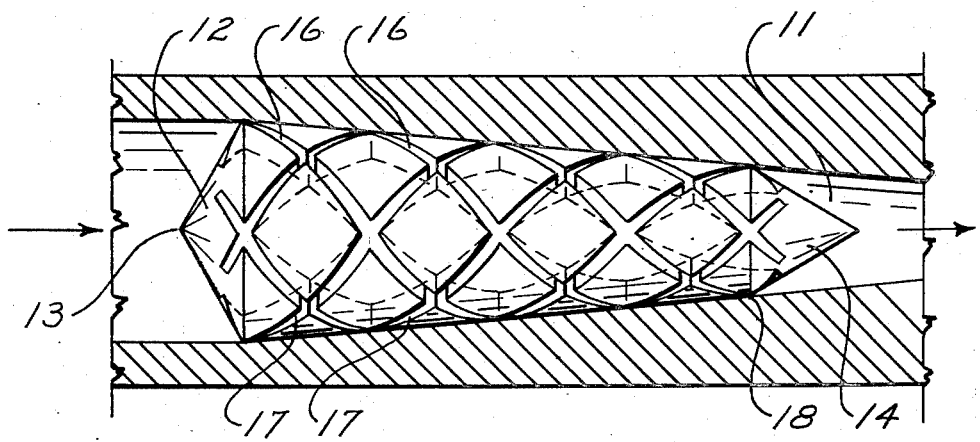

Figure 2 shows a specific embodiment of this invention wherein the plug is conical in shape and fits into the nozzle of the molding machine, said nozzle being in the shape of a truncated cone. Referring to the drawing, truncated cone 11 is the nozzle of an injection molding machine and 12 is a conical mixing plug the walls of which are contiguous with the walls of the nozzle. The ends of the plug are sharply tapered as shown at 13 and 14. The increased taper of delivery end 14 starts at point 18. The walls of the plug contain a plurality of right-hand grooves 16 and an equal number of left-hand grooves 17. The depth of the grooves is unchanged over the length of the plug until they reach point 18 at which tapered delivery end starts. As the grooves extend down the sides of end 14 they become progressively shallower.

This invention is particularly adapted for coloring moldable material in the injection molding process. Prior to this invention, it has been necessary to color moldable material by mixing the color with the moldable material in extrusion machines, on malaxating rolls, etc. The equipment for such color mixing is expensive and difficult to maintain and the step of adding color to the material prior to molding adds cost to the preparation of the material. By using the mixing plug of this invention, it becomes possible to add colorless molding powder plus color through simple metering devices directly into the hopper of an injection molding machine to obtain colored molded articles in which the color is thoroughly and completely dispersed throughout the molded article.

For example, an 8 ounce injection molding machine was provided with a mixing plug having eight left-hand grooves and eight right-hand grooves. The grooves were 1/16" wide and 5/32" deep. The pitch of the helices was 2.2". The plug was 1¾" long and had a diameter of ⅞". The plug was inserted into the nozzle of the injection molding machine. Then crystal clear polystyrene was introduced into the hopper of the machine through a metering device. At the same time, a dye known as Oil Red 1700 (Colour Index No. 258) was introduced into the hopper through a separate metering device synchronized with the first metering device. The temperature of the machine was maintained at about 450° F. A rectangular serving tray die was used. The trays made by the normal action of the machine using conventional temperature and pressure were a uniform red transparent color. No color specks or streaks were observed. When the mixing plug was removed and the process continued without other change, the trays produced were not uniformly colored and many color specks and streaks were visible.

The apparatus is also adapted to simultaneously malaxate and mold molding powders which have previously been blended with colors, lubricants, plasticizers etc., by crude mixing operations such as mixtures obtained by barrel rolling or other rotary tumbling apparatus or by the well known dry mixing processes. These crude mixing operations provide a resinous material the particles of which are coated or partially impregnated with the additive. When the crude mixtures are molded in injection molding machines containing the mixing plugs of this invention, the additives are completely dispersed throughout the resin and the articles produced are homogeneous.

It is obvious that variations may be made in the apparatus of this invention without departing from the spirit and scope thereof as defined by the appended claims.

What is claimed is:

1. In an apparatus wherein a plastic material in a flowable condition is forced through a chamber into a die, means for malaxating the plastic material forced through said chamber comprising a mixing plug fixedly positioned within a portion of said chamber, said mixing plug having a length not substantially greater than three times its width and a body portion with a cross-sectional shape substantially identical with the cross-sectional shape of the portion of said chamber within which it is fitted so that the peripheral surface of said body portion is in non-slipping contact with the wall of said chamber, said peripheral surface having incised therein an even number of continuous helical grooves through which said plastic material is forced, said grooves having a ratio of depth to width of from 1:1 to 5:1, one half of said grooves having a right-hand spiral and the other half of said grooves having a left-hand spiral, all of said grooves having substantially the same length, width, depth and pitch and being at least 8 in number.

2. An apparatus as in claim 1 wherein the ends of the plug are tapered, the end nearest to the die having the longer taper.

3. An apparatus as in claim 2 wherein the longer tapered end contains straight channels leading from the helical grooves towards the die.

4. An apparatus as in claim 1 wherein the chamber has a shoulder adapted to fixedly position the plug therein.

5. A mixing plug comprising a cylindrical body portion and conically tapered end portions, said body portion having incised in the surface thereof an even number of helical grooves extending continuously the length of said body portion, said grooves having a ratio of depth to width of from 1:1 to 5:1 and having the same length, width, depth and pitch, one-half of said grooves having a left-hand spiral and the other half of said grooves having a right-hand spiral, said grooves being at least 8 in number.

6. A mixing plug as in claim 5 wherein one of said conically tapered end portions has a longer taper than the other of said end portions.

7. A mixing plug as in claim 6 wherein the longer tapered end portion contains a plurality of straight channels leading from the adjacent ends of said helical grooves.

ROLLIN D. KEENEY.

References Cited in the file of this patent

UNITED STATES PATENTS

| Number | Name | Date |
|--------|------|------|
| 133,229 | Hyatt et al. | Nov. 19, 1872 |
| 2,479,261 | Reetz | Aug. 16, 1949 |
| 2,500,401 | Cossette | Mar. 14, 1950 |

FOREIGN PATENTS

| Number | Country | Date |
|--------|---------|------|
| 269,761 | Great Britain | Apr. 28, 1927 |